(12) United States Patent
Häfner et al.

(10) Patent No.: US 8,891,209 B2
(45) Date of Patent: Nov. 18, 2014

(54) HVDC HYBRID CIRCUIT BREAKER WITH SNUBBER CIRCUIT

(75) Inventors: Jürgen Häfner, Ludvika (SE); Arman Hassanpoor, Ludvika (SE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 14/358,771

(22) PCT Filed: Nov. 18, 2011

(86) PCT No.: PCT/EP2011/070484
§ 371 (c)(1),
(2), (4) Date: May 16, 2014

(87) PCT Pub. No.: WO2013/071980
PCT Pub. Date: May 23, 2013

(65) Prior Publication Data
US 2014/0313628 A1 Oct. 23, 2014

(51) Int. Cl.
*H01H 9/30* (2006.01)
*H02H 3/22* (2006.01)

(52) U.S. Cl.
CPC ...................................... *H02H 3/22* (2013.01)
USPC .............................................. 361/13; 361/19

(58) Field of Classification Search
CPC .............................. H02H 7/001; H01H 33/596
USPC ..................................................... 361/13, 19
See application file for complete search history.

(56) References Cited

U.S. PATENT DOCUMENTS 5,210,674 A * 5/1993 Yamaguchi et al. ............ 361/19
5,452,170 A 9/1995 Ohde et al.

FOREIGN PATENT DOCUMENTS

| DE | 43 04 863 A1 | 8/1993 |
| EP | 0 660 352 A1 | 6/1995 |
| EP | 0 758 137 A1 | 2/1997 |
| WO | WO 2011/057675 A1 | 5/2011 |

* cited by examiner

*Primary Examiner* — Rexford Barnie
*Assistant Examiner* — Tien Mai
(74) *Attorney, Agent, or Firm* — Birch, Stewart, Kolasch & Birch, LLP

(57) ABSTRACT

A high voltage direct current (HVDC) hybrid circuit breaker is provided. The circuit breaker includes a solid-state main breaker, a mechanical fast disconnector and a solid-state auxiliary breaker connected in series, the series-connection of the disconnector and the auxiliary breaker being connected in parallel to the main breaker, a snubber circuit including a capacitor, and a switching device being arranged for disconnecting the snubber capacitor in response to the auxiliary breaker being opened. By disconnecting the snubber capacitor, an uncontrolled discharging of the capacitor through the disconnector and the main breaker, and the resulting non-zero current flowing through the disconnector during the breaking action, may be avoided. Further, a method of an HVDC hybrid circuit breaker is provided.

9 Claims, 3 Drawing Sheets

HVDC HYBRID CIRCUIT BREAKER WITH SNUBBER CIRCUIT

FIELD OF THE INVENTION

The invention relates in general to high voltage direct current (HVDC) hybrid circuit breakers, and more specifically to snubber circuits in such circuit breakers.

BACKGROUND OF THE INVENTION

HVDC hybrid circuit breakers, such as disclosed in WO 2011/057675, are typically based on a combination of a solid-state main breaker connected in parallel to a series-connection of a solid-state auxiliary breaker and a mechanical disconnector. The principal of operation of a hybrid circuit breaker is that the main breaker, the auxiliary breaker, and the disconnector are closed during normal operation. If a trip signal is received, the hybrid circuit breaker attempts to break the current flowing through it by first opening the auxiliary breaker, thereby commutating the current flowing through the auxiliary breaker and the disconnector to the main breaker. Subsequently, the disconnector is opened for disconnecting the auxiliary breaker, and finally the main breaker is opened, resulting in a commutation of the current from the main breaker to a surge arrester connected in parallel to the main breaker.

Frequently, hybrid circuit breakers are supplied with snubber circuits in order to suppress voltage transients which arise in response to the sudden interruption of the current when the disconnector is opened. A snubber circuit typically comprises a capacitor which is connected in parallel to the auxiliary breaker.

When the breaking operation of the hybrid circuit breaker is initiated by opening the auxiliary breaker, the snubber capacitor is charged, but as soon as the current commutates from the auxiliary breaker to the main breaker, the capacitor is discharged through the disconnector and the main breaker. This discharging process, and the resulting non-zero current through the disconnector, hinders the breaking operation of the disconnector.

SUMMARY OF THE INVENTION

It is an object of the present invention to provide a more efficient alternative to the above techniques and prior art.

More specifically, it is an object of the present invention to provide an improved HVDC hybrid circuit breaker.

These and other objects of the present invention are achieved by means of direct current (DC) circuit breaker having the features defined in independent claim 1, and by means of a method of a DC circuit breaker defined in independent claim 7. Embodiments of the invention are characterized by the dependent claims.

According to a first aspect of the invention, a DC circuit breaker is provided. The circuit breaker comprises a main breaker, a disconnector, an auxiliary breaker, and a snubber circuit. The disconnector and the auxiliary breaker are connected in series. The series-connection of the disconnector and the auxiliary breaker is connected in parallel to the main breaker. The snubber circuit comprises a capacitor. The capacitor is connected in parallel to the auxiliary breaker. The circuit breaker further comprises switching means. The switching means is arranged for disconnecting the snubber capacitor. The snubber capacitor is disconnected in response to the auxiliary breaker being opened.

According to a second aspect of the invention, a method of a DC circuit breaker is provided. The circuit breaker comprises a main breaker, a disconnector, an auxiliary breaker, and a snubber circuit. The disconnector and the auxiliary breaker are connected in series. The series-connection of the disconnector and the auxiliary breaker is connected in parallel to the main breaker. The snubber circuit comprises a capacitor. The capacitor is connected in parallel to the auxiliary breaker. The method comprises disconnecting the snubber capacitor. The snubber capacitor is disconnected in response to the auxiliary breaker being opened.

The present invention makes use of an understanding that an uncontrolled discharging of the snubber capacitor during the breaking operation of an HVDC hybrid circuit breaker may be prevented by providing the circuit breaker with switching means which is arranged for disconnecting the capacitor in response to the auxiliary breaker being opened. In other words, the switching means is opened when the auxiliary breaker is opened. For instance, a control unit being arranged for controlling the hybrid circuit breaker, may further be arranged for controlling the switching means so as to open the switching means at the same time as the auxiliary breaker, or shortly after. As an alternative, the switching means may be arranged for detecting a state, or a state change, of the auxiliary breaker. The latter may, e.g., be achieved by receiving a signal from the control unit of the hybrid circuit breaker, the signal being indicative of the state, or a state change, of the auxiliary breaker. As a further alternative, the switching means may also be provided with means for detecting a state change of the auxiliary breaker by monitoring the voltage over, and/or the current through, the snubber capacitor. In this case, a sudden change in the measured quantities may be indicative of the auxiliary breaker being opened.

An embodiment of the invention is advantageous since the problems associated with prior art hybrid circuit breakers, which problems arise due to a discharging current flowing from the capacitor through the disconnector and the main breaker, are mitigated. More specifically, the non-zero current flowing through the disconnector of a prior art hybrid circuit breaker impedes the breaking action of the disconnector. In an embodiment of the present invention on the other hand, an uncontrolled discharging of the capacitor is prevented, thereby allowing the disconnector to break the current.

According to an embodiment of the invention, the switching means is connected in series with the snubber capacitor.

According to an embodiment of the invention, the switching means comprises a power semiconductor switching element.

According to an embodiment of the invention, the switching means and/or the power semiconductor switching element comprises one or more of an insulated gate bipolar transistor (IGBT) and a bi-mode insulated gate transistor (BiGT).

According to an embodiment of the invention, the main breaker comprises a plurality of power semiconductor switching elements. The switching elements are connected in series.

According to an embodiment of the invention, the disconnector comprises a mechanical switch.

According to an embodiment of the invention, the auxiliary breaker comprises a power semiconductor switching element. Further, the auxiliary breaker may comprise a plurality of power semiconductor switching elements connected in series and/or in parallel.

Even though advantages of the present invention have in some cases been described with reference to embodiments of the hybrid circuit breaker according to the first aspect of the invention, corresponding reasoning applies to embodiments of the method according to the second aspect of the invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
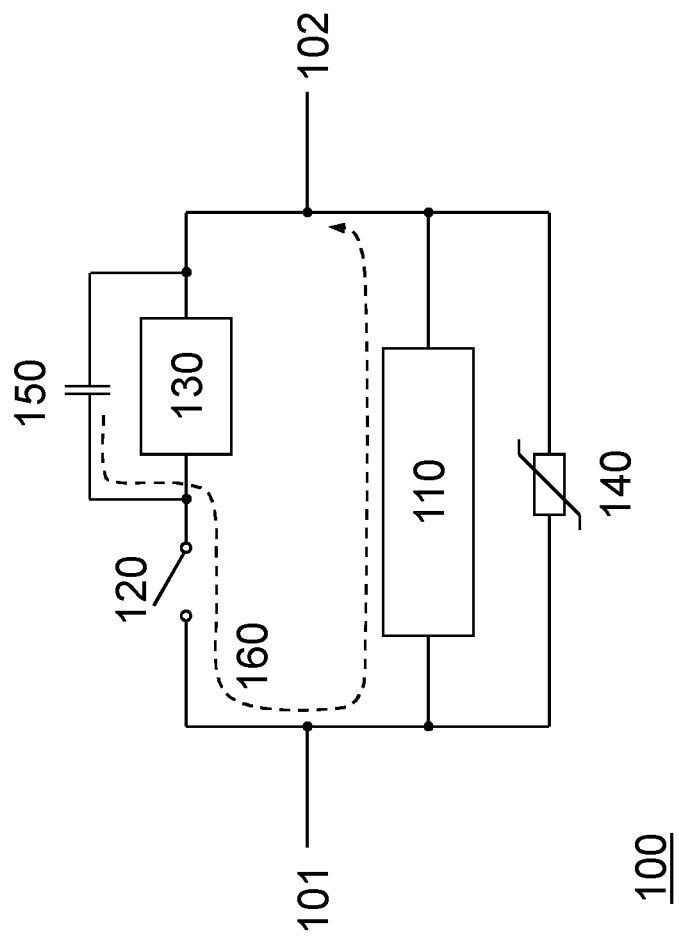
FIG. 1 is a schematic illustration of a prior art HVDC hybrid circuit breaker.

With reference to FIG. 1, a prior art HVDC hybrid circuit breaker is described.

Hybrid circuit breaker 100 comprises a main breaker 110, a fast disconnector, i.e., a high-speed switch, 120, an auxiliary breaker 130, a surge arrester 140, and a snubber capacitor 150. Disconnector 120 and auxiliary breaker 130 are connected in series, and the series connection of disconnector 120 and auxiliary breaker 130 is connected in parallel to main breaker 110. Surge arrester 140 is connected in parallel to main breaker 110 and the series-connection of disconnector 120 and auxiliary breaker 130. Snubber capacitor 150 is connected in parallel to auxiliary breaker 130.

Hybrid circuit breaker 100 may be connected to an external circuit, such as an HVDC transmission line, at terminals 101 and 102. For instance, hybrid circuit breaker 100 may be used to connect an HVDC transmission line to a busbar of a switchyard, for the purpose of disconnecting the transmission line from the busbar in the event of a failure, or for maintenance.

In the following, the principal of operation of hybrid circuit breaker 100 is described. During normal operation, main breaker 110, disconnector 120, and auxiliary breaker 130, are closed. If a trip signal is received by hybrid circuit breaker 100, circuit breaker 100 attempts to break the current flowing through it, i.e., from terminal 101 to 102, or vice versa, by first opening auxiliary breaker 130, thereby commutating the current flowing through auxiliary breaker 130 and disconnector 120 to main breaker 110. Subsequently, disconnector 120 is opened for disconnecting auxiliary breaker 130, and finally main breaker 110 is opened, resulting in a commutation of the current from main breaker 110 to surge arrester 140.

Hybrid circuit breaker 100 is equipped with snubber capacitor 150 for the purpose of suppressing voltage transients across auxiliary breaker 130 which arise in response to the sudden interruption of the current when auxiliary breaker 130 is opened. Even though hybrid circuit breaker 100 has been described as comprising a snubber capacitor 150, it will be appreciated that more advanced snubber circuits 120 may be utilized.

A problem which arises in prior art hybrid circuit breakers, such as hybrid circuit breaker 100 described with reference to FIG. 1, is that the charged snubber capacitor 150 is discharged through disconnector 120 and main breaker 110 when auxiliary breaker 130 is opened, as is illustrated by arrow 160 in FIG. 1. As a consequence of the non-zero current flowing through disconnector 120, the breaking action of disconnector 120 is hindered.

Figure 2:
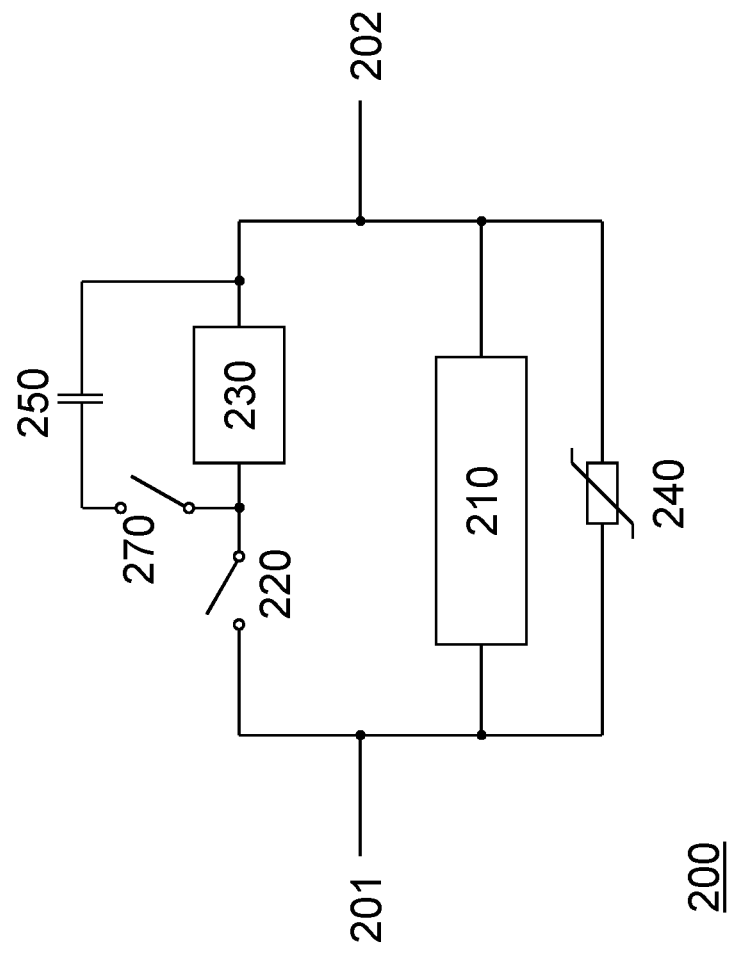
FIG. 2 is a schematic illustration of an HVDC hybrid circuit breaker in accordance with an embodiment of the invention.

In the following, an embodiment of the invention is described with reference to FIG. 2.

Hybrid circuit breaker 200 is similar to circuit breaker 100, described with reference to FIG. 1, in that it comprises a main breaker 210, a fast disconnector, i.e., a high-speed switch, 220, an auxiliary breaker 230, a surge arrester 240, and a snubber capacitor 250. Disconnector 220 and auxiliary breaker 230 are connected in series, and the series connection of disconnector 220 and auxiliary breaker 230 is connected in parallel to main breaker 210. Surge arrester 240 is connected in parallel to main breaker 210 and the series-connection of disconnector 220 and auxiliary breaker 230. Snubber capacitor 250 is connected in parallel to auxiliary breaker 230.

Hybrid circuit breaker 200 may be connected to an external circuit, such as an HVDC transmission line, at terminals 201 and 202. For instance, hybrid circuit breaker 200 may be used to connect an HVDC transmission line to a busbar of a switchyard, for the purpose of disconnecting the transmission line from the busbar in the event of a failure, or for maintenance.

Main breaker 210, disconnector 220, and auxiliary breaker 230 may be based on different types of breaker technologies. For instance, main breaker 210 and auxiliary breaker 230 may be based on solid-state switches, i.e., power semiconductor devices, such as transistors or thyristors, as is elucidated further below. In order to achieve higher voltage ratings, main breaker 210 and auxiliary breaker 230 may comprise a plurality of solid-state switches connected in series. Further, in order to increase the current rating, main breaker 210 and auxiliary breaker 230 may be based on power semiconductor switching elements connected in parallel. Disconnector 220 may, e.g., be based on a mechanical switch.

Hybrid circuit breaker 200 is further configured with switching means 270, which is arranged for preventing an uncontrolled discharging of snubber capacitor 250 via disconnector 220 and main breaker 210, as was described hereinabove with reference to FIG. 1. To this end, switching means 270, which is connected in series with capacitor 250, is opened together with auxiliary breaker 230, thereby disconnecting capacitor 250. As a consequence, the discharging of capacitor 250 is prevented, thereby eliminating the non-zero current through disconnector 220 during the breaking action of disconnector 220. In that way, the problems associated with prior art hybrid circuit breakers, such as circuit breaker 100, are mitigated, and disconnector 220 may break the current and disconnect auxiliary breaker 230.

Switching means 270 may, e.g., be based on solid-state switches of the same or a similar type as main breaker 210 and auxiliary breaker 230. Switching means 270 may for example comprise an insulated gate bipolar transistor (IGBT) or a bi-mode insulated gate transistor (BiGT).

Figure 3:
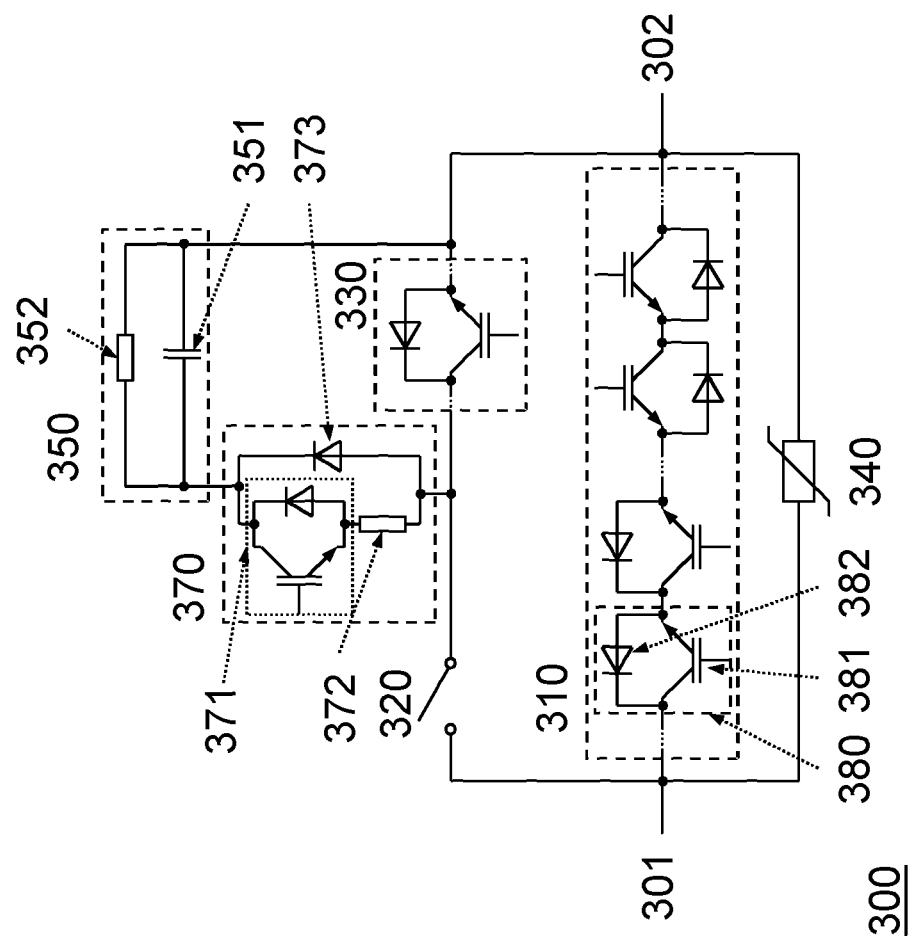
FIG. 3 shows an HVDC hybrid circuit breaker in accordance with another embodiment of the invention.

In FIG. 3, a further embodiment of a hybrid circuit breaker in accordance with the invention is illustrated.

Hybrid circuit breaker 300 comprises a main breaker 310, a fast disconnector, i.e., a high-speed switch, 320, an auxiliary breaker 330, a surge arrester 340, a snubber circuit 350, and switching means 370. Disconnector 320 and auxiliary breaker 330 are connected in series, and the series connection of disconnector 320 and auxiliary breaker 330 is connected in parallel to main breaker 310. Surge arrester 340 is connected in parallel to main breaker 310 and the series-connection of disconnector 320 and auxiliary breaker 330. Snubber circuit 350 is connected in parallel to auxiliary breaker 330. Switching means 370 is connected in series with snubber circuit 350 and is arranged for preventing an uncontrolled discharging of snubber capacitor 350, as was described hereinbefore.

Similar to circuit breakers 100 and 200, hybrid circuit breaker 300 may be connected to an external circuit, such as an HVDC transmission line, at terminals 301 and 302.

Further with reference to FIG. 3, main breaker 310 is based on a series-connection of power semiconductor switching elements 380. Power semiconductor switching element 380 may, e.g., be based on an insulated gate bipolar transistor (IGBT) 381 and a diode 382 connected anti-parallel to transistor 381. Auxiliary breaker 330 may be based on the same or similar type of power semiconductor switching element 380. Further, auxiliary breaker 330 may comprise a plurality of switching elements connected in series and/or in parallel. It will also be appreciated that main breaker 310 and auxiliary breaker 330 may comprise power semiconductor switching elements connected in parallel, thereby increasing the current rating of the respective breaker.

Snubber circuit 350 comprises a capacitor 351 and a resistor 352 connected in parallel.

Switching means 370 comprises a switching element 371, such as power semiconductor switching element 380 or similar, connected in series with a resistor 372. The series-connection of switching element 371 and resistor 372 is connected parallel to a diode 373.

Switching means 370 and/or switching element 371 may for example comprise an IGBT or a BiGT.

Main breaker 310, disconnector 320, auxiliary breaker 330, and switching means 370, in particular power semiconductor switching element 371, are controlled by a control unit (not shown in FIG. 3). The control unit may either be arranged at hybrid circuit breaker 300 or at an external unit, such as a control unit of an HVDC switchyard.

The person skilled in the art realizes that the present invention by no means is limited to the embodiments described above. On the contrary, many modifications and variations are possible within the scope of the appended claims.

In conclusion, an HVDC hybrid circuit breaker is provided. The circuit breaker comprises a solid-state main breaker, a mechanical fast disconnector and a solid-state auxiliary breaker connected in series, the series-connection of the disconnector and the auxiliary breaker being connected in parallel to the main breaker, a snubber circuit comprising a capacitor, and switching means being arranged for disconnecting the snubber capacitor in response to the auxiliary breaker being opened. By disconnecting the snubber capacitor, an uncontrolled discharging of the capacitor through the disconnector and the main breaker, and the resulting non-zero current flowing through the disconnector during the breaking action, may be avoided. Further, a method of an HVDC hybrid circuit breaker is provided.

The invention claimed is:

1. A direct current, DC, circuit breaker comprising:
   a main breaker,
   a disconnector and an auxiliary breaker connected in series,
   the series-connection of the disconnector and the auxiliary breaker being connected in parallel to the main breaker, and
   a snubber circuit comprising a capacitor, the capacitor being connected in parallel to the auxiliary breaker,
   wherein the circuit breaker further comprises switching means being arranged for disconnecting the snubber capacitor in response to the auxiliary breaker being opened.

2. The DC circuit breaker according to claim 1, wherein the switching means is connected in series with the snubber capacitor.

3. The DC circuit breaker according to claim 1, wherein the switching means comprises a power semiconductor switching element.

4. The DC circuit breaker according to claim 3, wherein the power semiconductor switching element comprises an insulated gate bipolar transistor, IGBT.

5. The DC circuit breaker according to claim 3, wherein the power semiconductor switching element comprises a bi-mode insulated gate transistor, BiGT.

6. The DC circuit breaker according to claim 1, wherein the main breaker comprises a plurality of series-connected power semiconductor switching elements.

7. The DC circuit breaker according to claim 1, wherein the disconnector comprises a mechanical switch.

8. The DC circuit breaker according to claim 1, wherein the auxiliary breaker comprises a power semiconductor switching element.

9. A method of a direct current, DC, circuit breaker, the circuit breaker comprising:
   a main breaker,
   a disconnector and an auxiliary breaker connected in series,
   the series-connection of the disconnector and the auxiliary breaker being connected in parallel to the main breaker, and
   a snubber circuit comprising a capacitor, the capacitor being connected in parallel to the auxiliary breaker,
   wherein the method comprises disconnecting the snubber capacitor in response to the auxiliary breaker being opened.

* * * * *